US012548728B2

(12) United States Patent
Yoneda

(10) Patent No.: US 12,548,728 B2
(45) Date of Patent: Feb. 10, 2026

(54) FUSE ELEMENT, FUSE DEVICE, AND PROTECTION DEVICE

(71) Applicant: DEXERIALS CORPORATION, Shimotsuke (JP)

(72) Inventor: Yoshihiro Yoneda, Shimotsuke (JP)

(73) Assignee: DEXERIALS CORPORATION, Shimotsuke (JP)

( * ) Notice: Subject to any disclaimer, the term of this patent is extended or adjusted under 35 U.S.C. 154(b) by 55 days.

(21) Appl. No.: 18/279,276

(22) PCT Filed: Mar. 7, 2022

(86) PCT No.: PCT/JP2022/009735
§ 371 (c)(1),
(2) Date: Aug. 29, 2023

(87) PCT Pub. No.: WO2022/191133
PCT Pub. Date: Sep. 15, 2022

(65) Prior Publication Data

US 2024/0136137 A1 Apr. 25, 2024
US 2024/0234069 A9 Jul. 11, 2024

(30) Foreign Application Priority Data

Mar. 9, 2021 (JP) ................................ 2021-037365

(51) Int. Cl.
*H01H 85/10* (2006.01)
*H01H 85/00* (2006.01)
*H01H 85/055* (2006.01)

(52) U.S. Cl.
CPC ...... *H01H 85/055* (2013.01); *H01H 85/0047* (2013.01); *H01H 85/10* (2013.01)

(58) Field of Classification Search
CPC .................. H01H 85/055–12; H01H 85/0047
See application file for complete search history.

(56) References Cited

U.S. PATENT DOCUMENTS 2,816,989 A * 12/1957 Sugden .................. H01H 85/10 337/292
2005/0040926 A1* 2/2005 Ely ........................ H01H 85/11 337/159

(Continued)

FOREIGN PATENT DOCUMENTS

JP 2015041491 A 3/2015
JP 2015069728 A 4/2015

(Continued)

OTHER PUBLICATIONS

Office Action issued Aug. 29, 2024 in Korean Patent Application No. 10-2023-7014643 (with English translation), 9 pages.

(Continued)

*Primary Examiner* — Jacob R Crum
(74) *Attorney, Agent, or Firm* — Element IP, PLC

(57) ABSTRACT

A fuse element includes a low-melting-point metal plate, a first high-melting-point metal layer, and a second high-melting-point metal layer. The low-melting-point metal plate has a first main surface, a second main surface, a first side surface, and a second side surface. The first main surface and the second main surface face each other. The first side surface and the second side surface face each other and each connect the first main surface and second main surface. The first high-melting-point metal layer is disposed on the first main surface and second main surface. The second high-melting-point metal layer is disposed on the first side surface and second side surface. The fuse element has a cut-out portion in which at least a portion of the second high-melting-point metal layer is cut out.

14 Claims, 4 Drawing Sheets

(56) References Cited

U.S. PATENT DOCUMENTS

| | | | | |
|---|---|---|---|---|
| 2010/0176910 | A1 * | 7/2010 | Knab | H01H 37/761 337/290 |
| 2016/0240342 | A1 * | 8/2016 | Yoneda | H01H 85/08 |
| 2017/0236673 | A1 * | 8/2017 | Yoneda | H01H 85/143 337/293 |
| 2018/0025879 | A1 * | 1/2018 | Ho | H01H 85/06 337/187 |
| 2019/0172673 | A1 * | 6/2019 | Yoneda | H01H 85/11 |

FOREIGN PATENT DOCUMENTS

| | | | |
|---|---|---|---|
| JP | 2015097183 | A | 5/2015 |
| JP | 2017147210 | A | 8/2017 |
| JP | 6324684 | B2 | 5/2018 |
| TW | 201517105 | A | 5/2015 |
| TW | 201522031 | A | 6/2015 |
| TW | 201526064 | A | 7/2015 |

OTHER PUBLICATIONS

Office Action issued Apr. 16, 2024 in corresponding Japanese Patent Application No. 2021-037365 (with English translation), 6 pages.
Written Opinion of the International Searching Authority issued May 17, 2022 in PCT/JP2022/009735 (with English translation), 8 pages.
International Search Report issued May 17, 2022 in PCT/JP2022/009735 (with English translation), 4 pages.
Combined Taiwanese Office Action and Search Report issued Oct. 14, 2025, in corresponding Taiwanese Patent Application No. 111108523 (with machine English translation), 9 pages.

* cited by examiner

FUSE ELEMENT, FUSE DEVICE, AND PROTECTION DEVICE

TECHNICAL FIELD

The present invention relates to a fuse element and a fuse device and protection device using that fuse element.

The present application claims priority based on JP 2021-037365 filed in Japan on Mar. 9, 2021, and the contents thereof are incorporated herein.

BACKGROUND TECHNOLOGY

A fuse device that interrupts a current path by a fuse element itself generating heat and fusing is known as a current interrupting device for interrupting a current path when an overcurrent exceeding a rated value is flown through a circuit board. Moreover, a protection device using a heater (heater) is known as a current interrupting device for interrupting a current path at the time of a generation of an abnormality other than a generation of an overcurrent in the circuit board. This protection device is configured to cause the heater to generate heat by energizing the heater and to use that heat to fuse a fuse element during an abnormality other than the generation of an overcurrent.

A laminated fuse element having a low-melting-point metal plate and a high-melting-point metal layer laminated on a surface of the low-melting-point metal plate is known as a fuse element used in the fuse device and protection device. As the laminated fuse element, an element having a pair of first side-end parts facing each other and formed thicker than a main surface part, and a pair of second side-end parts facing each other and formed to a thinner thickness than the first side-end part, is known (Patent Document 1). In the protection device disclosed in Patent Document 1, the second side-end parts are disposed along the energizing direction. This is able to quickly fuse with little heat energy compared to when the first side-end parts are disposed along the energizing direction.

CITATION LIST

Patent Documents

Patent Document 1: JP 6324684

SUMMARY OF INVENTION

Problem to be Solved by Invention

It has been investigated to make a width of the fuse element relative to the energizing direction wider in order to reduce an electrical resistance. However, if the width of a conventional laminated fuse element is widened, when the element is soldered by reflow to an electrode or terminal of the fuse device or protection device, sometimes, the low-melting-point metal plate would melt, and the fuse element warps into a partially crushed shape. The partially crushed shaped fuse element has an increased risk of breaking due to the increased resistance value at the crushed portion and temperature stress. Moreover, when the width of the fuse element is widened, there is a risk of fusing becoming difficult during an abnormality such as a generation of an overcurrent.

The present invention is made in consideration of the above circumstances and has an object of providing a fuse element in which it occurs less likely that the low-melting-point metal plate melts and warps during reflow even when the width of the fuse element relative to the direction of current is wide, and which is capable of quickly fusing during an abnormality such as a generation of an overcurrent, and a fuse device and protection device using this fuse element.

Means for Solving the Problem

The present invention suggests the following means to resolve the above problems.

(1) A fuse element of one embodiment of the present invention includes a low-melting-point metal plate having a mutually opposite first main surface and second main surface and a mutually opposite first side surface and second side surface connecting the first main surface and second main surface, a first high-melting-point metal layer laminated on the first main surface and second main surface, and a second high-melting-point metal layer laminated on the first side surface and second side surface, wherein the fuse element has a cut-out portion in which at least a portion of the second high-melting-point metal layer is deficient.

(2) In the embodiment according to (1) above, the second high-melting-point metal layer may be configured having a thicker thickness than the first high-melting-point metal layer.

(3) The embodiment according to (1) or (2) above may be configured having the melting point of a material constituting the low-melting-point metal plate in a range of 138° C. or more and 250° C. or less, and the melting point of a material constituting the first high-melting-point metal layer and the second high-melting-point metal layer 100° C. or more higher than the melting point of the material configuring the low-melting-point metal plate.

(4) The embodiments according to (1) to (3) above may be configured with the second high-melting-point metal layer having a thickness in a range of 4 μm or more and 40 μm or less, and the first high-melting-point metal layer having a thickness in a range of 3 μm or more and 30 μm or less.

(5) A fuse device of one embodiment of the present invention includes a fuse element according to (1) to (4) above, wherein the first side surface and the second side surface of the fuse element are disposed to extend in a direction along the energizing direction.

(6) A protection device of one embodiment of the present invention includes a fuse element according to (1) to (4) above and a heater for heating the fuse element, wherein the first side surface and the second side surface of the fuse element are disposed to extend in a direction along the energizing direction.

Effect of the Invention

According to the present invention, it is possible to provide a fuse element in which it occurs less likely that the low-melting-point metal plate melts and warps during reflow even when the width of the fuse element relative to the energizing direction is wide, and which is capable of quickly fusing during an abnormality such as a generation of an overcurrent, and a fuse device and protection device using this fuse element.

EMBODIMENTS OF THE INVENTION

Present embodiments are described in detail with appropriate reference to drawings The drawings used in the description below may illustrate characteristic components enlarged for convenience for ease of understanding the characteristics and may differ from the actual dimensional ratios of the constituent elements. Materials, dimensions, and the like used in the description below are examples, and the present invention is not limited by them. It is possible to appropriately change them within a scope that achieves the effect of the present invention.

First Embodiment

Figure 1:
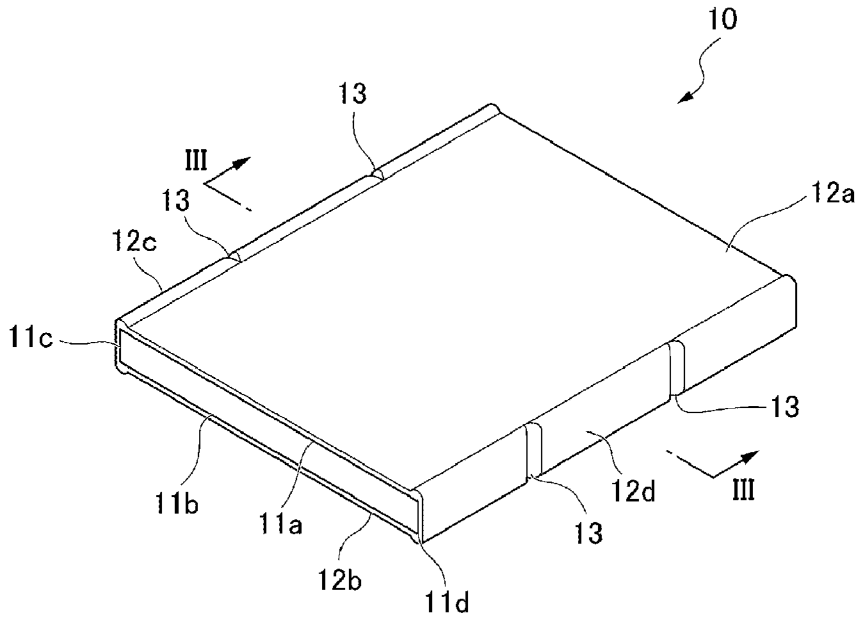
FIG. 1 is a perspective view of a fuse element of a first embodiment of the present invention.
Figure 2:
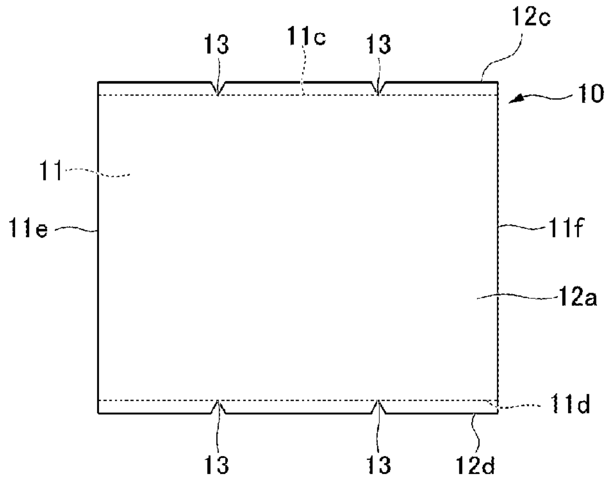
FIG. 2 is a plan view of the fuse element illustrated in FIG. 1.
Figure 3:
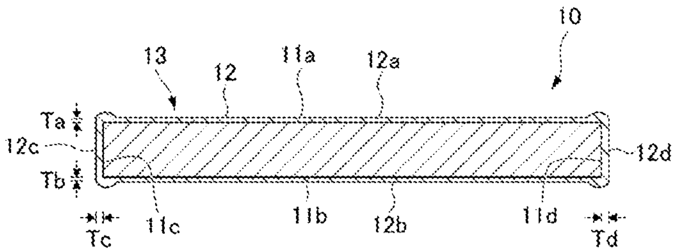
FIG. 3 is a III-III line cross-sectional view of FIG. 1.

FIG. 1 is a perspective view of a fuse element of a first embodiment of the present invention, FIG. 2 is a plan view of the fuse element illustrated in FIG. 1, and FIG. 3 is a III-III line cross-sectional view of FIG. 1.

A fuse element 10 of the present embodiment, as illustrated in FIG. 1 to FIG. 3, has a low-melting-point metal plate 11, and first high-melting-point metal layers 12*a*, 12*b*, and second high-melting-point metal layers 12*c*, 12*d* laminated on the low-melting-point metal plate 11. The second high-melting-point metal layers 12*c*, 12*d* has a cut-out portion 13, in which at least a portion of the second high-melting-point metal layer is cut out.

The low-melting-point metal plate 11 seen in a plan view is a quadrangle, and has a mutually opposite first main surface 11*a* and second main surface 11*b*, and four side surfaces connecting the first main surface 11*a* and second main surface 11*b*. The four side surfaces are a mutually opposite first side surface 11*c* and second side surface 11*d*, and a mutually opposite third side surface 11*e* and fourth side surface 11*f*. A thickness of the low-melting-point metal plate 11 is preferably 30 μm or more. A film thickness of the low-melting-point metal plate 11 may be 60 μm or more, 100 μm or more, or 500 μm or more. A maximum value of a film thickness of the low-melting-point metal plate 11 may be appropriately selected, for example, 3,000 μm or less. 2,000 μm or less, 1,500 μm or less, or the like may also be selected as necessary.

The first high-melting-point metal layers 12*a*, 12*b* are laminated on the first main surface 11*a* and second main surface 11*b* of the low-melting-point metal plate 11, respectively. The second high-melting-point metal layers 12*c*, 12*d* are laminated on the first side surface 11*c* and second side surface 11*d* of the low-melting-point metal plate 11, respectively. A thickness Tc of the second high-melting-point metal layer 12*c* laminated on the first side surface 11*c* and a thickness Td of the second high-melting-point metal layer 12*d* laminated on the second side surface 11*d* are thicker than a thickness Ta of the first high-melting-point metal layer 12*a* laminated on the first main surface 11*a* and a thickness Tb of the first high-melting-point metal layer 12*b* laminated on the second main surface 11*b* (see FIG. 3). The thickness Tc of the second high-melting-point metal layer 12*c* and the thickness Td of the second high-melting-point metal layer 12*d* are preferably in a range of 4 μm or more and 40 μm or less, and more preferably in a range of 4 μm or more and 30 μm or less. The thickness Ta of the first high-melting-point metal layer 12*a* and the thickness Tb of the first high-melting-point metal layer 12*b* are preferably in a range of 3 μm or more and 30 μm or less, and more preferably in a range of 3 μm or more and 20 μm or less. Moreover, the thicknesses Tc, Td of the second high-melting-point metal layers 12*c*, 12*d*, when the thicknesses Ta, Tb of the first high-melting-point metal layers 12*a*, 12*b* are made to be 100, are preferably in a range of 110 or more and 150 or less, and more preferably in a range of 120 or more and 140 or less.

A cut-out portion 13 is provided on the second high-melting-point metal layers 12*c*, 12*d*. In the present embodiment, a shape of the cut-out portion 13 seen in a plan view is a triangle (see FIG. 2), but the shape of the cut-out portion 13 is not particularly limited. The shape of the cut-out portion 13, for example, seen in a plan view may be a semicircle, or may be a quadrangle (square, rectangle, trapezoid). Moreover, in the present embodiment, a depth of the cut-out portion 13 is made to be a depth whereat the low-melting-point metal plate 11 is exposed, but the depth of the cut-out portion 13 is not particularly limited. The depth of the cut-out portion 13, for example, may be a depth whereat the low-melting-point metal plate 11 is not exposed, or may be a depth whereat a portion of the low-melting-point metal plate 11 is cut out. Furthermore, in the present embodiment, a number of the cut-out portion 13 is made to be two for the each of the second high-melting-point metal layers 12*c*, 12*d*, but the number of the cut-out portion 13 is not particularly limited. The number of the cut-out portion 13, for example, may be one, or may be three or more. It is preferable that a ratio of a total area of the cut-out portion 13 relative to an area of the second high-melting-point metal layers 12*c*, 12*d* exceeds 0% and is 50% or less.

It is preferable that the melting point of the low-melting-point metal plate 11 is no more than a heating temperature during reflow performed when manufacturing the fuse device or protection device. When a reflow temperature is 240° C. to 260° C., it is preferable that a melting point TL of a material constituting the low-melting-point metal plate 11 is within a range of 138° C. or more and 250° C. or less. The melting point TL may be in a range of 138° C. or more and 218° C. or less or in a range of 218° C. or more and 250° C. or less as necessary. Note that the melting of a material constituting the low-melting-point metal plate 11 may be a liquidus temperature of the material.

A material of the low-melting-point metal plate 11 is preferably tin or a tin alloy containing tin as a main component. To contain tin as the main component in the tin alloy, a content of tin of the tin alloy is preferably 40 mass % or more, and more preferably 60 mass % or more. The content of the tin may be 70 mass % or more or 80 mass % or more. A maximum value of the content of the tin may be freely selected, for example, 99 mass % or less, or 97 mass % or less. A Sn—Bi alloy, an In—Sn, and a Sn—Ag—Cu alloy are examples of a tin alloy.

A high-melting-point metal layer 12 is a layer composed of a metal material liquefied in a melted substance of the low-melting-point metal plate 11. When a material of the low-melting-point metal plate 11 is tin or a tin alloy, a material of the high-melting-point metal layer 12 is preferably at least one type of metal selected from the group composed of zinc, antimony, aluminum, silver, gold, copper, nickel, cobalt, and iron, or an alloy having the metal as a main component. To contain metal as the main component in the alloy, a content of metal in the alloy is preferably 40 mass % or more, and more preferably 60 mass % or more. The content of the metal may be 70 mass % or more or 80 mass % or more. A maximum value of the content of the metal may be freely selected, for example, 99 mass % or less, or 97 mass % or less. Phosphor bronze, a silver palladium alloy, a nickel iron alloy, and a nickel-cobalt alloy are examples of the alloy. From the perspective of high electric conductivity of the fuse element 10 in a normal state, a material of the high-melting-point metal layer 12 is preferably any of copper, a copper alloy, silver, and a silver alloy.

A melting point TH of a material constituting this layer of the high-melting-point metal layer 12 is preferably 100° C. or more higher than the melting point TL of the material constituting the low-melting-point metal plate 11. That is, the melting point of the high-melting-point metal layer 12 is preferably 100° C. or more higher than the low-melting-point metal plate 11. It is more preferable that the difference between the melting point TH and the melting point TL (melting point TH-melting point TL) is 500° C. or more, and particularly preferably 800° C. or more. The difference between the melting point TH and the melting point TL may be 1,500° C. or less. Moreover, the melting point TH is preferably in a range of 400° C. or more and 1,700° C. or less. The melting point TH may be in a range of 400° C. or more and 600° C. or less, a range of 600° C. or more and 1,000° C. or less, or a range of 1,000° C. or more and 1,600° C. or less as necessary.

The fuse element 10 of the present embodiment may, for example, be manufactured by covering a front surface of the low-melting-point metal plate 11 with a high-melting-point metal constituting the high-melting-point metal layer 12. An electroplating method may be used as a method for covering the low-melting-point metal plate 11 with a high-melting-point metal. A covered low-melting-point metal plate covered with a high-melting-point metal may be repeatedly obtained by repeatedly conveying a long-shaped low-melting-point metal plate lengthwise in a plating bath using an electroplating method. Moreover, in a covered low-melting-point metal plate obtained by an electroplating method, an electric field strength of an edge portion of the low-melting-point metal plate, that is, a side surface portion in the width direction of the long-shaped low-melting-point metal plate is relatively strengthened, and the high-melting-point metal layer 12 is thickly plated. Thus, a long-shaped covered low-melting-point metal plate having a high-melting-point metal layer of a side surface portion having a thicker thickness than a high-melting-point metal layer of a main surface portion is obtained. The fuse element 10 of the present embodiment is produced by cutting the obtained long-shaped covered low-melting-point metal plate to a prescribed length and forming a cut-out portion 13 on one side surface portion of the obtained covered low-melting-point metal plate. Note that cutting the covered low-melting-point metal plate and forming the cut-out portion 13 may be performed at the same time, and cutting the covered low-melting-point metal plate may be performed after forming the cut-out portion 13.

In the fuse element 10 of the present embodiment configured as above, the first high-melting-point metal layers 12*a*, 12*b* are respectively laminated on the first main surface 11*a* and second main surface 11*b* of the low-melting-point metal plate 11, and the second high-melting-point metal layers 12*c*, 12*d* are respectively laminated on the first side surface 11*c* and second side surface 11*d*. Therefore, in the fuse element 10, by disposing the first side surface 11*c* and second side surface 11*d* to extend in a direction along the direction of current, it occurs less likely that the low-melting-point metal plate 11 melts and warps during reflow and the shape is stabilized even when the width of the fuse element is wide relative to the direction of current. Moreover, the second high-melting-point metal layers 12*c*, 12*d* have the cut-out portion 13. Thus, during an abnormality such as the generation of an overcurrent, since the second high-melting-point metal layers 12*c*, 12*d* are divided in advance by the cut-out portion 13, delay of fusing due to their unmelted portions can be prevented.

In the fuse element 10 of the present embodiment, when the lengths Tc, Td of the second high-melting-point metal layers 12*c*, 12*d* are thicker than the thicknesses Ta, Tb of the first high-melting-point metal layers 12*a*, 12*b*, a strength of the fuse element 10 is improved, further stabilizing the shape after reflow.

In the fuse element 10 of the present embodiment, when the melting point of the material constituting the low-melting-point metal plate 11 is in a range of 138° C. or more and 250° C. or less, because a molten form of the low-melting-point metal plate 11 during an abnormality such as the generation of an overcurrent is more easily formed, a melting speed during an abnormality is further increased. Moreover, when the melting point of the material constituting the first high-melting-point metal layers 12*a*, 12*b* and the second high-melting-point metal layer 12*c*, 12*d* is 100° C. or more higher than the melting point of the material constituting the low-melting-point metal plate 11, melting of the first high-melting-point metal layers 12*a*, 12*b* and the second high-melting-point metal layers 12*c*, 12*d* during reflow is less likely occur, and the shape after reflow is further stabilized.

In the fuse element 10 of the present embodiment, when the thicknesses Tc, Td of the second high-melting-point metal layers 12*c*, 12*d* are in a range of 4 μm or more and 40 μm or less and the thicknesses Ta, Tb of the first high-melting-point metal layers 12*a*, 12*b* are in a range of 3 μm or more and 30 μm or less, a stability of the shape after reflow and a melting speed during an abnormality are improved in well-balanced manner.

In the fuse element 10 of the present embodiment, a high-melting-point metal layer is not laminated on the third side surface 11*e* and fourth side surface 11*f* of the low-melting-point metal plate 11, but a high-melting-point metal layer may be laminated on the third side surface 11*e* and fourth side surface 11*f* of the low-melting-point metal plate 11. In this case, a thickness of a high-melting-point metal layer laminated on the third side surface 11*e* and the fourth side surface 11*f* is not particularly limited, and may be thicker or thinner than the thicknesses Tc, Td of the second high-melting-point metal layers 12*c*, 12*d*.

In the fuse element 10 of the present embodiment, flux may be coated on a front surface thereof. By coating flux, oxidation of the fuse element 10 is prevented. Thus, a wettability of the fuse element 10 to a joining material is improved when using a joining material such as solder to connect the fuse element 10 and an electrode or terminal of the fuse device or protection device. Moreover, by coating flux, adhesion of melted metal generated by arc discharge can be suppressed and insulation after fusing of the fuse element 10 can be improved.

Second Embodiment

Figure 4:
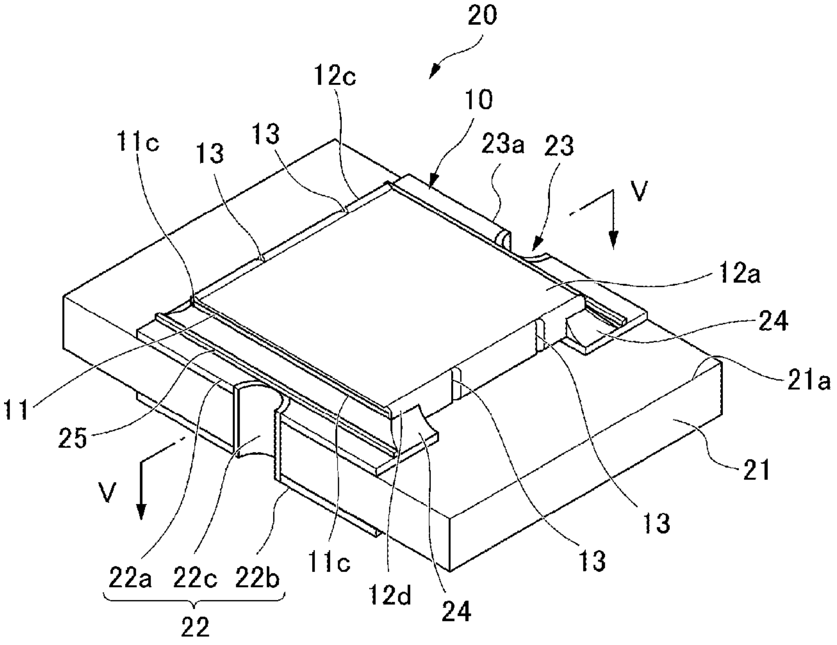
FIG. 4 is a perspective view of a fuse device of a second embodiment of the present invention.
Figure 5:
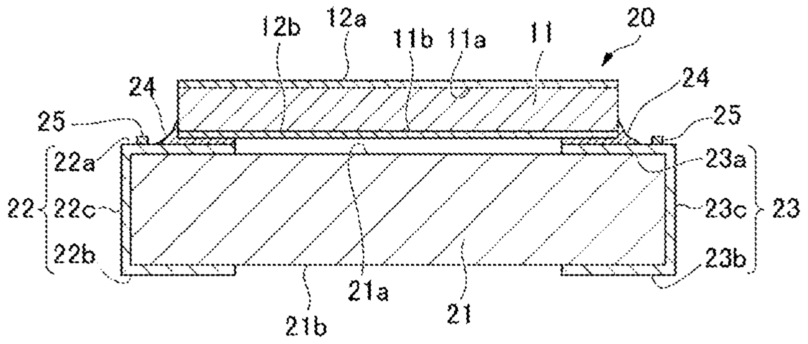
FIG. 5 is a V-V line cross-sectional view of FIG. 4.

FIG. 4 is a perspective view of a fuse device of a second embodiment of the present invention and FIG. 5 is a V-V line cross-sectional view of FIG. 4.

A fuse device 20 of the present embodiment, as illustrated in FIG. 4 and FIG. 5, is provided with an insulated substrate 21, a first electrode 22 and a second electrode 23 disposed on a pair of opposite end portions of the insulated substrate 21, and a fuse element 10 electrically connecting the first electrode 22 and second electrode 23. In the fuse device 20, a current flows between the first electrode 22 and second electrode 23 via the fuse element 10. In the fuse element 10, a first side surface 11*c* and a second side surface 11*d* of a low-melting-point metal plate 11 are disposed to extend in a direction along a direction in which a current in the fuse device 20 flows (direction of current). That is, second high-melting-point metal layers 12*c*, 12*d* of the fuse element 10 are disposed so that an end portion connects to the first electrode 22 and another end portion connects to the second electrode 23.

The insulated substrate 21 is not particularly limited so long as it has an electrically insulating property, and a known insulated substrate used as the circuit board such as a resin substrate, ceramic substrate, or a resin and ceramic complex substrate may be used. An epoxy resin substrate, a phenol resin substrate, and a polyimide substrate are examples of a resin substrate. An aluminum substrate, a glass ceramic substrate, a mullite substrate, and a zirconia substrate are examples of a ceramic substrate. A glass epoxy substrate is an example of a complex substrate.

The first electrode 22 has an upper-surface electrode 22*a* formed on an upper surface 21*a* of the insulated substrate 21, a lower-surface electrode 22*b* formed on a lower surface 21*b* of the insulated substrate 21, and a castellation 22*c* connecting the upper-surface electrode 22*a* and lower-surface electrode 22*b*. A connection between the upper-surface electrode 22*a* and lower-surface electrode 22*b* is not limited to a castellation, and may be performed by a through-hole. The second electrode 23 similarly has an upper-surface electrode 23*a*, a lower-surface electrode 23*b*, and a castellation 23*c*. The first electrode 22 and second electrode 23 are each formed by a conduction pattern such as silver wiring or copper wiring. A front surface of the first electrode 22 and second electrode 23 may be covered by an electrode protection layer to suppress alteration of electrode characteristics due to oxidation or the like. For example, an Sn plating film, an Ni/Au plating film, an Ni/Pd plating film, an Ni/Pd/Au plating film, or the like may be used as a material of an electrode protection layer.

The fuse element 10 electrically connects the first electrode 22 and the second electrode 23 via a joining material 24 such as solder. An insulating dam 25 is provided along the joining material 24 on the upper-surface electrode 22*a* of the first electrode 22 and the upper-surface electrode 23*a* of the second electrode 23. Melting and spillage to the outside of the joining material 24 is prevented by the insulating dam 25. Furthermore, flowing of a joining material such as solder used when the fuse device 20 is mounted on a circuit board, to the fuse element can also be prevented by the insulating dam 25.

The fuse device 20 may have a cover member installed. Protection of an inside of the fuse device 20 and prevention of scattering of melted material generated when the fuse element 10 fuses is possible by installing a cover member. Various engineering plastics and ceramics may be used as a material of a cover member.

The fuse device 20 is implemented on a current path of the circuit board via the first electrode 22 and second electrode 23. The low-melting-point metal plate 11 of the fuse element 10 provided on the fuse device 20 does not melt while a current of a rated value or less is flowing on a current path of the circuit board. Meanwhile, the low-melting-point metal plate 11 of the fuse element 10 generates heat and melts when an overcurrent exceeding a rated value is flown on a current path of the circuit board. Due to melted material produced in this way, first high-melting-point metal layers 12*a*, 12*b* liquefy and, using a cut-out portion 13 of the second high-melting-point metal layers 12*c*, 12*d* as an origin, the fuse element 10 fuses by the second high-melting-point metal layers 12*c*, 12*d* being divided. Then, due to the fuse element 10 fusing, the first electrode 22 and second electrode 23 disconnect and a current path of the circuit board is interrupted.

The fuse device 20 of the present embodiment configured as above uses the above fuse element 10 as a fuse element and the second high-melting-point metal layers 12*c*, 12*d* laminated on the first side surface 11*c* and second side surface 11*d* of the low-melting-point metal plate 11 of the fuse element 10 are disposed to extend in a direction along a direction in which a current in the fuse device 20 flows (direction of current). Thus, during reflow when manufacturing the fuse device 20, it occurs less likely that the low-melting-point metal plate 11 melts and warps since the second high-melting-point metal layers 12*c*, 12*d* support the low-melting-point metal plate 11, and the shape of the fuse element 10 after reflow is stabilized. Moreover, during generation of an overcurrent, since the second high-melting-point metal layers 12*c*, 12*d* are divided in advance by the cut-out portion 13, delay of fusing due to their unmelted portions can be prevented.

Third Embodiment

Figure 6:
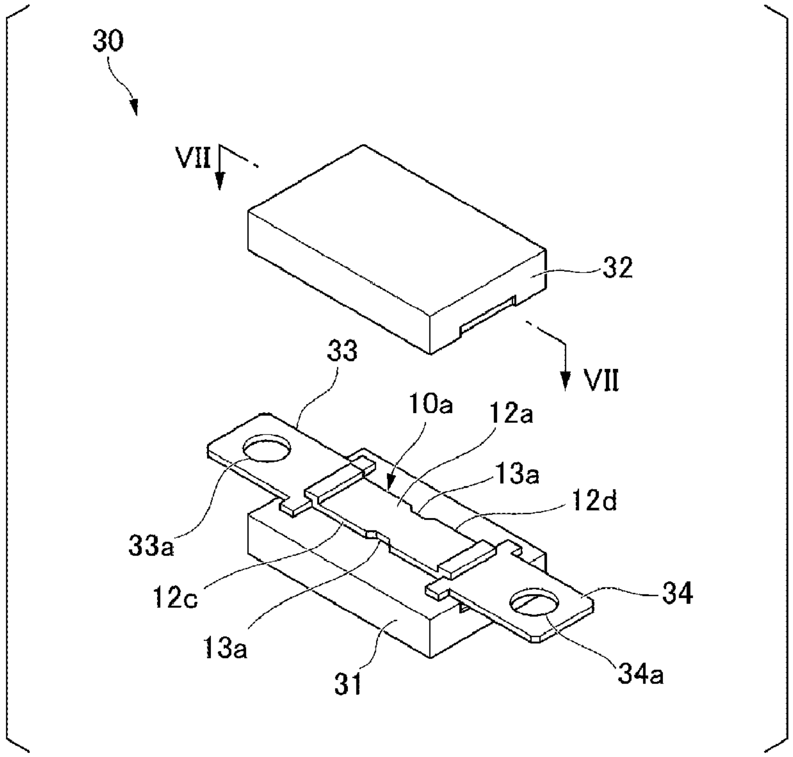
FIG. 6 is an exploded perspective view of a fuse device of a third embodiment of the present invention.
Figure 7:
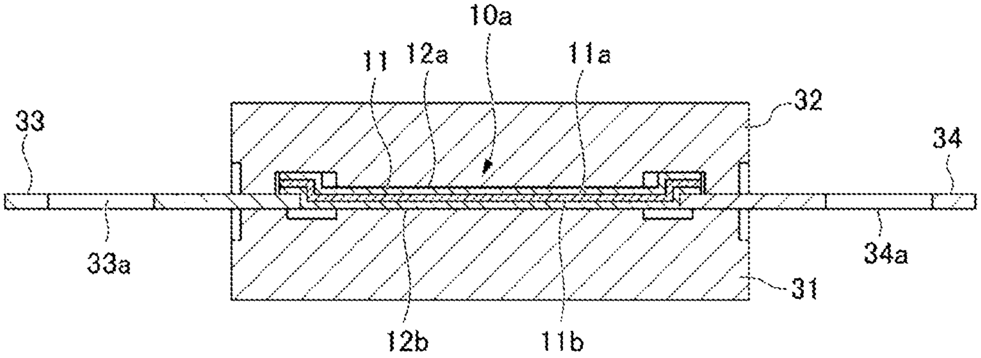
FIG. 7 is a VII-VII line cross-sectional view of FIG. 6.

FIG. 6 is an exploded perspective view of a fuse device of a third embodiment of the present invention and FIG. 7 is a VII-VII line cross-sectional view of FIG. 6.

A fuse device 30 of the present embodiment, as illustrated in FIG. 6 and FIG. 7, is provided with a lower case 31, an upper case 32, a first terminal 33, a second terminal 34, and a fuse element 10*a* electrically connecting the first terminal 33 and second terminal 34. In the fuse device 30, a current flows between the first terminal 33 and second terminal 34 via the fuse element 10*a*.

The fuse element 10*a*, like the fuse element 10, has a low-melting-point metal plate 11, and a first high-melting-point metal layer 12*a*, 12*b*, and second high-melting-point metal layer 12*c*, 12*d* laminated on the low-melting-point metal plate 11. Members of the fuse element 10*a* that are the same as members of the fuse element 10 are given the same reference signs, and description thereof is omitted.

In the fuse element 10*a*, a first side surface 11*c* and second side surface 11*d* of the low-melting-point metal plate 11 are disposed to extend in a direction along a direction in which a current in a fuse device 30 flows (direction of current). Then, the second high-melting-point metal layer 12*c* is laminated in the first side surface 11*c* of the low-melting-point metal plate 11, and the second high-melting-point metal layer 12*d* is laminated on the first side surface 11*d* of the low-melting-point metal plate 11. That is, second high-melting-point metal layers 12*c*, 12*d* of the fuse element 10*a* are disposed so that an end portion connects to the first terminal 33 and another end portion connects to the second terminal 34.

The lower case 31 and upper case 32 are not particularly limited in material so long as they are electrically insulating, and a resin, ceramic, resin and ceramic complex substrate, or the like may be used. A resin preferably has a high glass-transition temperature. A nylon resin is preferably used as a resin having a high glass-transition temperature due to having high tracking resistance. Among nylon resins, it is particularly preferable to use nylon 46, nylon 6T, or nylon 9T.

The first terminal 33 is provided with an external terminal hole 33*a*. Moreover, the second terminal 34 is provided with an external terminal hole 34*a*. For example, copper, brass, nickel, or the like may be used as a material of the first terminal 33 and second terminal 34. As a material of the first terminal 33 and second terminal 34, from the perspective of rigidity strengthening, it is preferable to use brass, and from the perspective of electrical resistance reduction, it is preferable to use copper. A material of the first terminal 33 and second terminal 34 may be the same or may be different.

The fuse element 10*a* has a cut-out portion 13*a* provided on each of the second high-melting-point metal layers 12*c*, 12*d*. Moreover, a shape of the cut-out portion 13*a* is a trapezoid.

The fuse device 30 is implemented on a current path of a circuit board via the first terminal 33 and second terminal 34. The low-melting-point metal plate of the fuse element 10*a* provided on the fuse device 30 does not melt while a current of a rated value or less is flowing on a current path of the circuit board. Meanwhile, the low-melting-point metal plate 11 of the fuse element 10*a* generates heat and melts when an overcurrent exceeding a rated value is flown on the current path of the circuit board. Due to melted material produced in this way, the first high-melting-point metal layers 12*a*, 12*b* liquefy and, using the cut-out portion 13*a* of the second high-melting-point metal layers 12*c*, 12*d* as an origin, the fuse element 10*a* fuses by the second high-melting-point metal layers 12*c*, 12*d* being divided. Then, due to the fuse element 10*a* fusing, the first terminal 33 and second terminal 34 disconnect and the current path of the circuit board is interrupted.

The fuse device 30 of the present embodiment configured as above uses the above fuse element 10*a* as a fuse element and the second high-melting-point metal layers 12*c*, 12*d* of the fuse element 10*a* are disposed to extend in a direction along a direction in which a current in the fuse device 30 flows (direction of current). Thus, during reflow when manufacturing the fuse device 30, it occurs less likely that the low-melting-point metal plate 11 melts and warps since the second high-melting-point metal layers 12*c*, 12*d* support the low-melting-point metal plate 11, and the shape of the fuse element 10*a* after reflow is stabilized. Moreover, during generation of an overcurrent, since the second high-melting-point metal layers 12*c*, 12*d* are divided in advance by the cut-out portion 13*a*, delay of fusing due to their unmelted portions can be prevented.

Fourth Embodiment

Figure 8:
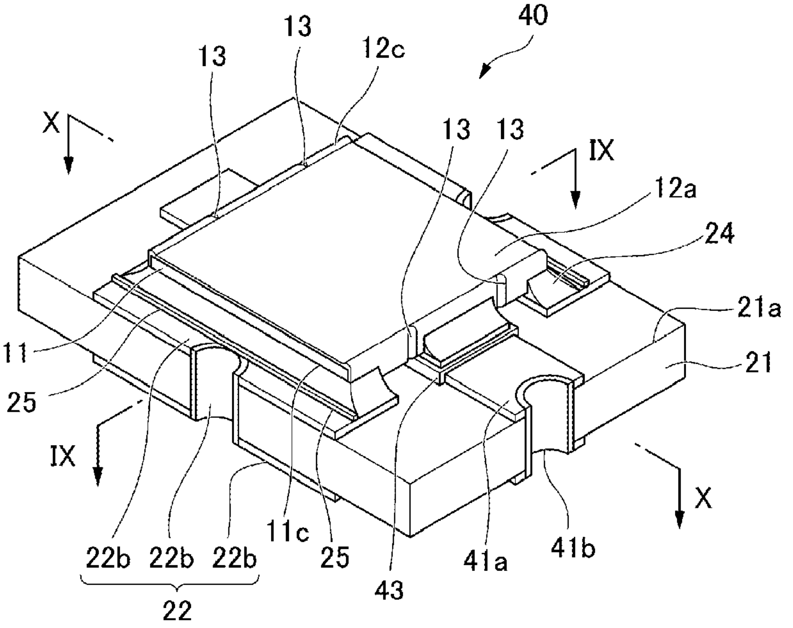
FIG. 8 is a perspective view of a protection device of a fourth embodiment of the present invention.
Figure 9:
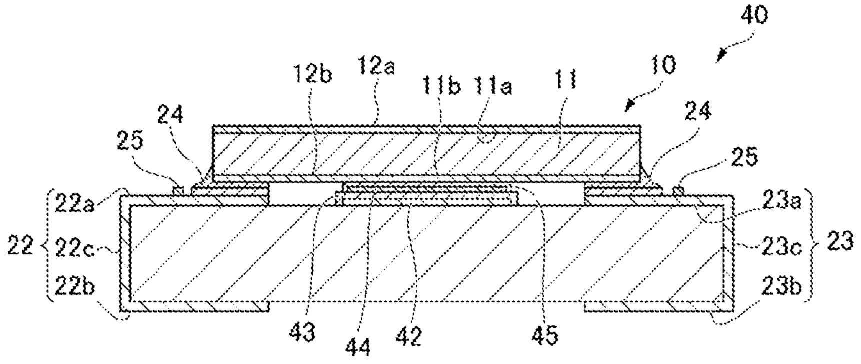
FIG. 9 is a IX-IX line cross-sectional view of FIG. 8.
Figure 10:
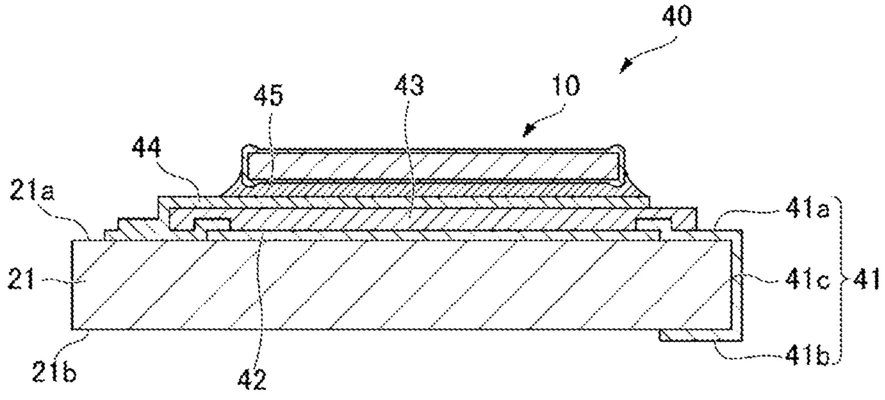
FIG. 10 is a X-X line cross-sectional view of FIG. 8.

FIG. 8 is a perspective view of a protection device of a fourth embodiment of the present invention, FIG. 9 is a IX-IX line cross-sectional view of FIG. 8, and FIG. 10 is a X-X line cross-sectional view of FIG. 8. A protection device 40 of the present embodiment, as illustrated in FIG. 8 to FIG. 10, is provided with an insulated substrate 21, a first electrode 22 and a second electrode 23 disposed on a pair of opposite end portions of the insulated substrate 21, and a fuse element 10 electrically connecting the first electrode 22 and second electrode 23. The insulated substrate 21, first electrode 22, second electrode 23, and fuse element 10 are the same as the above fuse device 20 and so are given the same reference signs and detailed description thereof is omitted.

The protection device 40 is further provided with a third electrode 41, a heater 42 connected to the third electrode 41, an insulating member 43 covering the heater 42, and a fourth electrode 44. The fourth electrode 44 has one end connected to the heater 42 and is connected to a first high-melting-point metal layer 12*b* laminated on a second main surface 11*b* of the fuse element 10 via a joining material 45.

The third electrode 41 is made so that a current is provided when an abnormality other than a generation of an overcurrent is generated in a circuit board. The third electrode 41 has an upper-surface electrode 41*a* formed on an upper surface 21*a* of the insulated substrate 21, a lower-surface electrode 41*b* formed on a lower surface 21*b* of the insulated substrate 21, and a castellation 41*c* connecting the upper-surface electrode 41*a* and lower-surface electrode 41*b*. A connection between the upper-surface electrode 41*a* and lower-surface electrode 41*b* is not limited to a castellation, and may be performed by a through-hole. The third electrode 41 is formed by a conduction pattern such as silver wiring or copper wiring. A front surface of the third electrode 41 may be covered by an electrode protection layer to suppress alteration of electrode characteristics due to oxidation or the like. For example, an Sn plating film, an Ni/Au plating film, an Ni/Pd plating film, an Ni/Pd/Au plating film, or the like may be used as a material of an electrode protection layer.

The heater 42 has a relatively high resistance and is formed from a high-resistance conductive material which is heated by a current. For example, nichrome, W, Mo, Ru, or the like, or an alloy or a powdered body of composition or compound including these may be used as a high-resistance conductive material. For example, the heater 42 may be formed by a method such as preparing a substance in which a high-resistance conductive material, resin binder, and the like are mixed and made into a paste, screen printing this to form a pattern on the upper surface 21*a* of the insulated substrate 21, and firing.

For example, glass may be used as a material of the insulating member 43. The fourth electrode 44 is disposed to be opposite the heater 42 via the insulating member 43. For example, solder may be used as the joining material 45. The heater 42 is superimposed with the fuse element 10 via the insulating member 43, fourth electrode 44, and joining material 45 by disposing in this way. By using such a superimposed structure, it is possible to efficiently transmit heat generated by the heater 42 to the fuse element 10 in a narrow range.

The protection device 40 may have a cover member installed. By installing the cover member, it is possible to protect an inside of the protection device 40 and to prevent melted material generated when the fuse element 10 fuses from scattering. Various engineering plastics and ceramics may be used as a material of a cover member.

The protection device 40 is implemented on a current path of the circuit board via the first electrode 22 and second electrode 23. The low-melting-point metal plate 11 of the fuse element 10 provided on the protection device 40 does not melt while a current of a rated value or less is flowing on the current path of the circuit board. Meanwhile, the low-melting-point metal plate 11 of the fuse element 10 generates heat and melts when an overcurrent exceeding a rated value is flown on a current path of the circuit board.

Due to melted material produced in this way, first high-melting-point metal layers 12*a*, 12*b* liquefy and, using a cut-out portion 13 of second high-melting-point metal layers 12*c*, 12*d* as an origin, the fuse element 10 fuses by the second high-melting-point metal layers 12*c*, 12*d* being divided. Then, due to the fuse element 10 fusing, the first electrode 22 and second electrode 23 are disconnected and the current path of the circuit board is interrupted.

Moreover, in the protection device 40, when an abnormality is generated in the circuit board, the heater 42 is supplied a current via the third electrode 41 by a current control device provided on the circuit board. The heater 42 generates heat by this current. Then, the heat is transmitted to the fuse element 10 via the insulating member 43, fourth electrode 44, and joining material 45. The low-melting-point metal plate 11 of the fuse element 10 melts and a melted substance is produced by the heat. Due to melted material produced in this way, first high-melting-point metal layers 12*a*, 12*b* liquefy and, using the cut-out portion 13 of second high-melting-point metal layers 12*c*, 12*d* as an origin, the fuse element 10 fuses by the second high-melting-point metal layers 12*c*, 12*d* being divided. Then, due to the fuse element 10 fusing, the first electrode 22 and second electrode 23 are disconnected and the current path of the circuit board is interrupted.

The protection device 40 of the fourth embodiment of the present invention configured as above uses the above fuse element 10 as a fuse element and the second high-melting-point metal layers 12*c*, 12*d* of the fuse element 10 are disposed to extend in a direction along a direction in which a current in the fuse device 20 flows (direction of current). Thus, during reflow when manufacturing the protection device 40, it occurs less likely that the low-melting-point metal plate 11 melts and warps since the second high-melting-point metal layers 12*c*, 12*d* support the low-melting-point metal plate 11, and the shape of the fuse element 10 after reflow is stabilized. Moreover, during an abnormality such as a generation of an overcurrent, since the second high-melting-point metal layers 12*c*, 12*d* are divided in advance by the cut-out portion 13, delay of fusing due to their unmelted portions can be prevented.

DESCRIPTION OF REFERENCE SIGNS

10, 10*a* Fuse element
11 Low-melting-point metal plate
11*a* First main surface
11*b* Second main surface
11*c* First side surface
11*d* Second side surface
11*e* Third side surface
11*f* Fourth side surface
12*a*, 12*b* First high-melting-point metal layer
12*c*, 12*d* Second high-melting-point metal layer
13, 13*a* Cut-out portion
21 Insulated substrate
22 First electrode
22*a* Upper-surface electrode
22*b* Lower-surface electrode
22*c* Castellation
23 Second electrode
23*a* Upper-surface electrode
23*b* Lower-surface electrode
23*c* Castellation
24 Joining material
25 Insulating dam
30 Fuse device
31 Lower case
32 Upper case
33 First terminal
33*a* External terminal hole
34 Second terminal
34*a* External terminal hole
40 Protection device
41 Third electrode
41*a* Upper-surface electrode
41*b* Lower-surface electrode
41*c* Castellation
42 Heater
43 Insulating member
44 Fourth electrode
45 Joining material

The invention claimed is:

1. A protection device, comprising:
a fuse element; and
a heater configured to heat the fuse element,
wherein the fuse element comprises;
a low-melting-point metal plate having a first main surface, a second main surface, a first side surface, and a second side surface, the first main surface and the second main surface facing each other, and the first side surface and the second side surface facing each other and each connecting the first main surface and second main surface;
a first high-melting-point metal layer disposed on the first main surface and second main surface; and
a second high-melting-point metal layer disposed on the first side surface and second side surface,
wherein the fuse element has a cut-out portion in which at least a portion of the second high-melting-point metal layer is cut out,
wherein the second high-melting-point metal layer is thicker than the first high-melting-point metal layer,
wherein each of the first side surface and the second side surface of the fuse element is disposed to extend along an energizing direction, and
wherein when the heater generates heat, the low-melting-point metal plate melts, the first high-melting-point metal layers are dissolved due to melted low-melting-point metal plate and, using the cut-out portion of the second high-melting-point metal layers as an origin, the fuse element fuses by the second high-melting-point metal layers being divided.

2. The protection device according to claim 1, wherein a melting point of a material constituting the low-melting-point metal plate is in a range of 138° C. or more and 250° C. or less, and
each of a melting point of a material constituting the first high-melting-point metal layer and a melting point of a material constituting the second high-melting-point metal layer is 100° C. or more higher than the melting point of a material constituting the low-melting-point metal plate.

3. A protection device, comprising:
a fuse element; and
a heater configured to heat the fuse element,
wherein the fuse element comprises;
a low-melting-point metal plate having a first main surface, a second main surface, a first side surface, and a second side surface, the first main surface and the second main surface facing each other, and the first side surface and the second side surface facing each other and each connecting the first main surface and second main surface;

a first high-melting-point metal layer disposed on the first main surface and second main surface; and a second high-melting-point metal layer disposed on the first side surface and second side surface, wherein the fuse element has a cut-out portion in which at least a portion of the second high-melting-point metal layer is cut out, wherein a melting point of a material constituting the low-melting-point metal plate is in a range of 138° C. or more and 250° C. or less, and wherein each of a melting point of a material constituting the first high-melting-point metal layer and a melting point of a material constituting the second high-melting-point metal layer is 100° C. or more higher than the melting point of a material constituting the low-melting-point metal plate, wherein each of the first side surface and the second side surface of the fuse element is disposed to extend along an energizing direction, and wherein when the heater generates heat, the low-melting-point metal plate melts, the first high-melting-point metal layers are dissolved due to melted low-melting-point metal plate and, using the cut-out portion of the second high-melting-point metal layers as an origin, the fuse element fuses by the second high-melting-point metal layers being divided.

4. The protection device according to claim 1, wherein the second high-melting-point metal layer has a thickness of 4 μm or more and 40 μm or less, and the first high-melting-point metal layer has a thickness of 3 μm or more and 30 μm or less.

5. The protection device according to claim 1, wherein a depth of the cut-out portion is a depth in which the low-melting-point metal plate is exposed, and wherein a ratio of a total area of the cut-out portion relative to an area of the second high-melting-point metal layers is 50% or less.

6. The protection device according to claim 1, wherein the cut-out portion is formed over an entire thickness direction of the fuse element such that the second high-melting-point metal layers are divided by the cut-out portion.

7. The protection device according to claim 3, wherein the second high-melting-point metal layer has a thickness of 4 μm or more and 40 μm or less, and the first high-melting-point metal layer has a thickness of 3 μm or more and 30 μm or less.

8. The protection device according to claim 3, wherein a depth of the cut-out portion is a depth in which the low-melting-point metal plate is exposed, and wherein a ratio of a total area of the cut-out portion relative to an area of the second high-melting-point metal layers is 50% or less.

9. The protection device according to claim 3, wherein the cut-out portion is formed over an entire thickness direction of the fuse element such that the second high-melting-point metal layers are divided by the cut-out portion.

10. A fuse element, comprising:

a low-melting-point metal plate having a first main surface, a second main surface, a first side surface, and a second side surface, the first main surface and the second main surface facing each other, and the first side surface and the second side surface facing each other and each connecting the first main surface and second main surface;

a first high-melting-point metal layer disposed on the first main surface and second main surface; and a second high-melting-point metal layer disposed on the first side surface and second side surface, wherein the fuse element has a cut-out portion in which at least a portion of the second high-melting-point metal layer is cut out, wherein a depth of the cut-out portion is a depth in which the low-melting-point metal plate is exposed, and wherein a ratio of a total area of the cut-out portion relative to an area of the second high-melting-point metal layers is 50% or less.

11. The fuse element according to claim 10, wherein the second high-melting-point metal layer is thicker than the first high-melting-point metal layer.

12. The fuse element according to claim 10, wherein a melting point of a material constituting the low-melting-point metal plate is in a range of 138° C. or more and 250° C. or less, and wherein each of a melting point of a material constituting the first high-melting-point metal layer and a melting point of a material constituting the second high-melting-point metal layer is 100° C. or more higher than the melting point of a material constituting the low-melting-point metal plate.

13. The fuse element according to claim 10, wherein the second high-melting-point metal layer has a thickness of 4 μm or more and 40 μm or less, and the first high-melting-point metal layer has a thickness of 3 μm or more and 30 μm or less.

14. The fuse element according to claim 10, wherein the cut-out portion is formed over an entire thickness direction of the fuse element such that the second high-melting-point metal layers are divided by the cut-out portion.

* * * * *